(12) United States Patent
Chongoushian et al.

(10) Patent No.: US 12,726,282 B2
(45) Date of Patent: Sep. 1, 2026

(54) SYSTEM AND SEMICONDUCTOR INTEGRATED CIRCUIT FOR MONITORING LINK 16 COMPLIANCE

(71) Applicant: BAE SYSTEMS Information and Electronic Systems Integration Inc., Nashua, NH (US)

(72) Inventors: John H. Chongoushian, Emerson, NJ (US); Joshua P. Mindler, Randolph, NJ (US); Jason E. Gerber, Pompton Lakes, NJ (US); Alexander Loh, Piscataway, NJ (US); Andrew W. Appel, Wayne, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 119 days.

(21) Appl. No.: 18/977,101

(22) Filed: Dec. 11, 2024

(65) Prior Publication Data

US 2026/0163653 A1 Jun. 11, 2026

(51) Int. Cl.

*H04B 17/10* (2015.01)
*H04B 1/00* (2006.01)
*H04B 17/00* (2015.01)
*H04B 17/16* (2015.01)

(52) U.S. Cl.

CPC ......... *H04B 17/104* (2015.01); *H04B 1/0003* (2013.01); *H04B 17/0085* (2013.01); *H04B 17/16* (2015.01)

(58) Field of Classification Search

CPC .... H04B 17/16; H04B 17/104; H04B 1/0003; H04B 1/0085

USPC .......................................................... 375/224

See application file for complete search history.

(56) References Cited

U.S. PATENT DOCUMENTS

| | | | | |
|---|---|---|---|---|
| 9,693,250 | B1 * | 6/2017 | Hou | H04B 1/12 |
| 2020/0212943 | A1 | 7/2020 | Banin et al. | |

FOREIGN PATENT DOCUMENTS

| | | | |
|---|---|---|---|
| EP | 3098990 | A1 | 11/2016 |

OTHER PUBLICATIONS

AMD Adaptive Computing. (Jun. 27, 2023). Zynq UltraScale+ RFSoC Data Sheet: Overview (DS889) (v1.14). Retrieved from https://docs.amd.com/v/u/en-US/ds889-zynq-usp-rfsoc-overview . 40 pages.

AMD Adaptive Computing. (2023). Zynq UltraScale+ RFSoC Product Selection Guide (XMP105 v1.12). Retrieved from https://docs.amd.com/v/u/en-US/zynq-usp-rfsoc-product-selection-guide. 5 pages.

(Continued)

*Primary Examiner* — Leila Malek

(74) *Attorney, Agent, or Firm* — Maine Cernota & Curran

(57) ABSTRACT

A Link 16 compliance monitoring system, and Link 16 compliance monitoring semiconductor integrated circuit, for LLD monitoring, frequency bin monitoring, and pulse width monitoring comprising an LLD monitoring subsystem, a frequency bin monitoring subsystem, and a pulse width monitoring subsystem, all sharing a frontend subsystem that performs A/D conversion of the inputted Link 16 transmission RF signal and that reduces overhead in digital signal processing by digitally multiplying the Link 16 transmission RF signal by a 1060 MHz complex sine wave waveform and then decimating the result.

19 Claims, 6 Drawing Sheets

(56) References Cited

OTHER PUBLICATIONS

"LINK 16 Electromagnetic Compatibility (EMC) Features Certification Process and Requirements" of Department of Defense Directive 4650.1, "Policy for Management and Use of the Electromagnetic Spectrum." (DoD 4650.1-R1, Assistant Secretary of Defense for Networks and Information Integration, Apr. 26, 2005). Retrieved from https://www.esd.whs.mil/Portals/54/Documents/DD/issuances/dodm/465001r1p.pdf. 115 pages.

Erik Blasch et al., Investigating effects of communications modulation technique on targeting performance, Proceedings vol. 6229, Intelligent Computing: Theory and Applications N: 62290G (2006), May 9, 2006, retrieved online from: https://www.spiedigitallibrary.org/ conference-proceedings-of-spie/6229/62290G/Investigating-effects-of-communications.modulation-technique-on-targeting-performance/ 10.1117 /12.668942.short.

International Search Report, PCT/US25/58886, mailed Mar. 2, 2026, 8 pages.

* cited by examiner

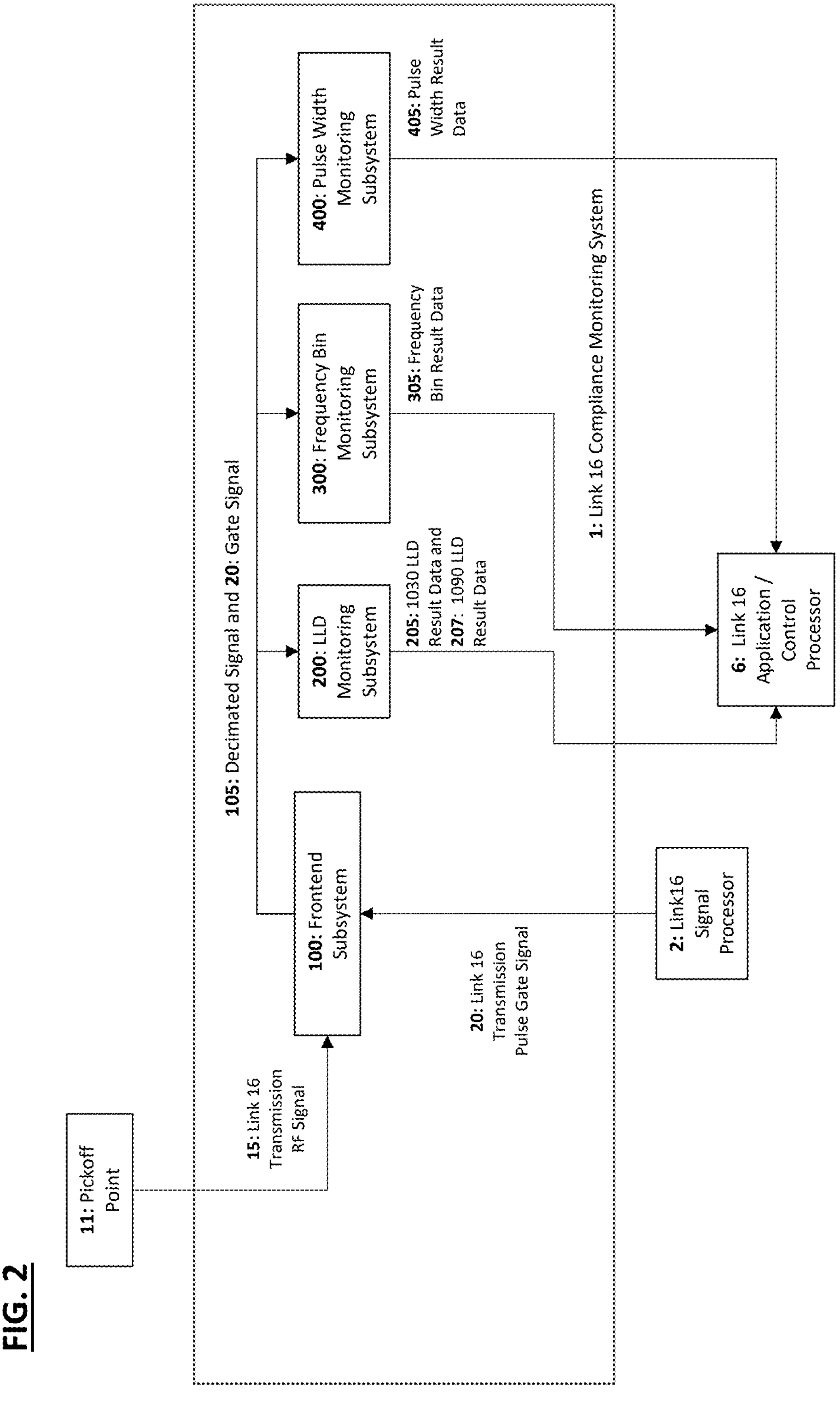
FIG. 2
11: Pickoff Point
15: Link 16 Transmission RF Signal
100: Frontend Subsystem
20: Link 16 Transmission Pulse Gate Signal
2: Link16 Signal Processor
105: Decimated Signal and 20: Gate Signal
200: LLD Monitoring Subsystem
205: 1030 LLD Result Data and 207: 1090 LLD Result Data
300: Frequency Bin Monitoring Subsystem
305: Frequency Bin Result Data
400: Pulse Width Monitoring Subsystem
405: Pulse Width Result Data
1: Link 16 Compliance Monitoring System
6: Link 16 Application / Control Processor 300: Frequency Bin Monitoring Subsystem
20: Link16 Transmission Pulse Gate Signal
105: Decimated Signal
310: Delaying Element
320: Conjugator
330: Digital Multiplier
340: Normalizer
350: Integrator
Phase [-π,π]
Magnitude
360: Frequency Bin Mapper
305: Frequency Bin Result Data

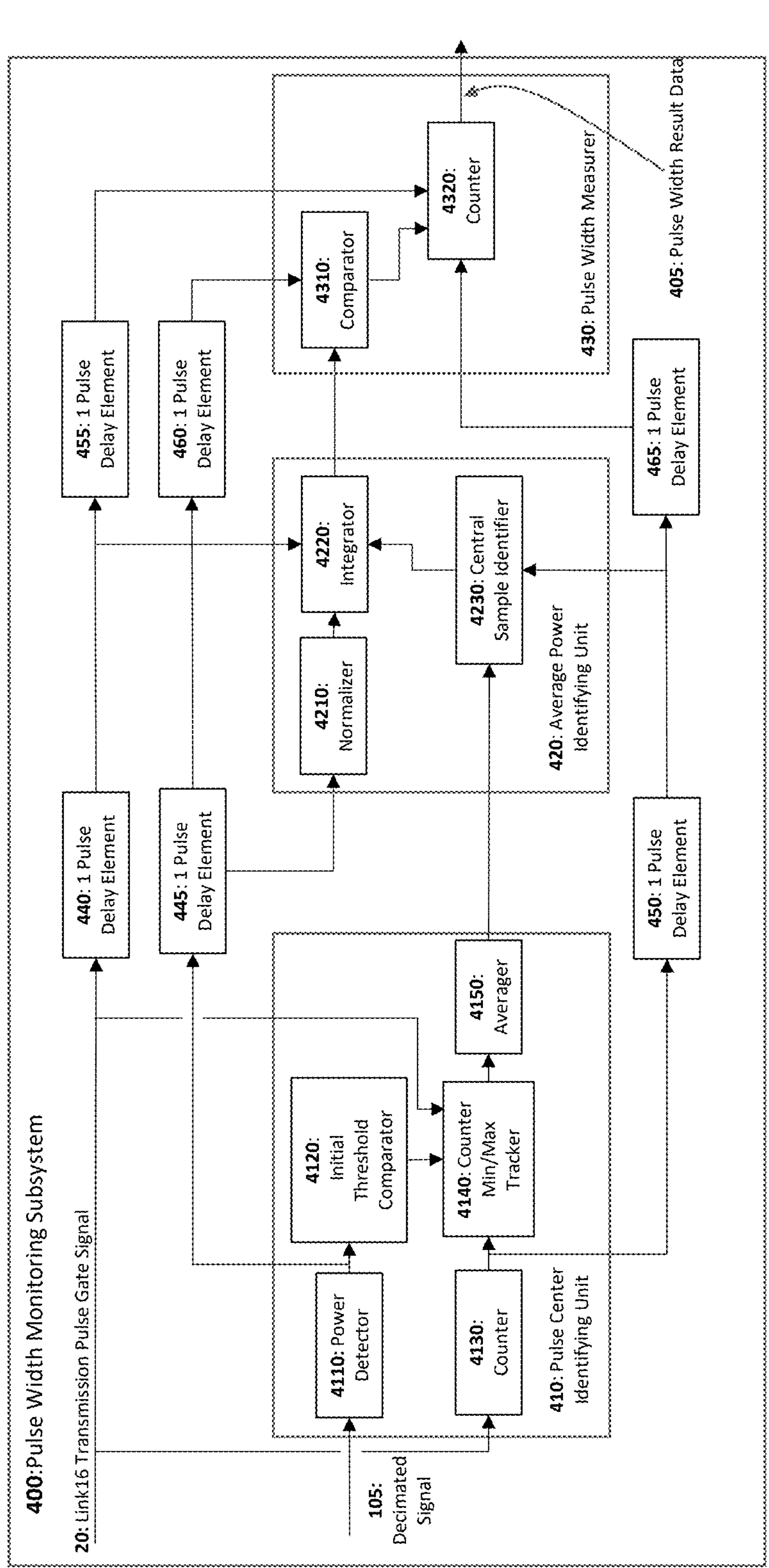
FIG. 6
400:Pulse Width Monitoring Subsystem
20: Link16 Transmission Pulse Gate Signal
105: Decimated Signal
410: Pulse Center Identifying Unit
4110: Power Detector
4120: Initial Threshold Comparator
4130: Counter
4140: Counter Min/Max Tracker
4150: Averager
440: 1 Pulse Delay Element
445: 1 Pulse Delay Element
450: 1 Pulse Delay Element
420: Average Power Identifying Unit
4210: Normalizer
4220: Integrator
4230: Central Sample Identifier
455: 1 Pulse Delay Element
460: 1 Pulse Delay Element
465: 1 Pulse Delay Element
430: Pulse Width Measurer
4310: Comparator
4320: Counter
405: Pulse Width Result Data

SYSTEM AND SEMICONDUCTOR INTEGRATED CIRCUIT FOR MONITORING LINK 16 COMPLIANCE

FIELD

This disclosure relates to monitoring circuitry for monitoring Link 16 compliance, and more particularly to digital circuitry for monitoring compliance with the 1030/1090 MHz Low Level Detection (LLD) Function requirements in AP1.4.2.1.2., the Pulse Width Monitor Function requirements in AP1.4.2.1.3., and the Uniform Use of Authorized Carriers requirements in AP1.4.2.1.4. in the "LINK 16 Electromagnetic Compatibility (EMC) Features Certification Process and Requirements" of Department of Defense Directive 4650.1, "Policy for Management and Use of the Electromagnetic Spectrum." (DoD 4650.1-R1, Assistant Secretary of Defense for Networks and Information Integration, Apr. 26, 2005), which is incorporated by reference herein for all purposes.

BACKGROUND

"The Department of Defense uses the 960-1215 MHz band for the Joint Tactical Information Distribution System (JTIDS), the Multifunctional Information Distribution System (MIDS), and other functionally similar Tactical Link systems (termed collectively, "Link 16 Terminals"). Based on its importance for aeronautical radio-navigation and supporting systems, the Department of Transportation (DOT) also has interests in this frequency band. Rapid growth in commercial and civil aviation during the 21st century shall increase the importance of ensuring spectrum supportability for existing and new systems that enhance air traffic safety." (DoD 4650.1-R1, Assistant Secretary of Defense for Networks and Information Integration, Apr. 26, 2005).

To ensure proper spectrum management and optimal system operation, and specifically to prevent interference with frequencies used in the navigation band by commercial aviation and to prevent interference with "identification of friend-or-foe" (IFF) functions, the Department of Defense has issued a directive (DoD 4650.1-R1) requiring self-certification of compliance, of EMC features of Link 16 systems, with applicable requirements and specifications. These requirements include measurement of specific characteristics (power levels at specific frequencies, pulse widths, etc.) of radio frequency energy generated by a Link 16 terminal when in use. While conventionally built-in test circuitry has been used in Link 16 terminals to provide real-time verification of compliance with standards for preventing interference with navigation functions and IFF functions, technological limitations in analog-digital converters (specifically, the limited dynamic range and spurious response of analog-digital converters (ADCs)) has required that the compliance measurements be performed using analog circuitry. The use of analog circuitry has required Link 16 terminals to comprise additional hardware circuitry on additional circuit cards, not only causing the Link 16 terminals to be more costly, but interfering with size, weight, and power (SWaP) objectives as well.

What is needed, therefore, is circuitry, for monitoring Link 16 compliance, that can take advantage of improvements in technology that allow ADCs to have sufficient dynamic performance, thereby enabling the Link 16 compliance monitoring circuitry to be integrated into a digital logic circuit board of a Link 16 terminal, to thereby enable real-time monitoring of compliance with the Department of Defense requirements, referenced above, while reducing the cost, size, weight, and power consumption of the Link 16 terminal.

SUMMARY

The present disclosure is a system for monitoring Link 16 compliance, incorporated into FPGA circuitry, enabling a digital based solution, either fully integrated into a single chip or hosted in a separate chip, that reduces size, weight, and power consumption, while increasing performance, in monitoring Link 16 compliance, in a novel design that takes advantage of functions that are possible in digital signal processing. As depicted in FIG. 2, the system comprises a frontend subsystem, an LLD (Low Level Detector) monitoring subsystem, a frequency bin monitoring subsystem, and a pulse width monitoring subsystem, where the combination of these subsystems provides significant efficiencies in SWAP-C(Size Weight and Power and Cost) through sharing substantial portions of the analytical circuitry.

One embodiment provides a Link 16 compliance monitoring system comprising: an analog-digital (A/D) convertor configured to receive, and perform A/D conversion on, a Link 16 transmission radio frequency (RF) signal to produce a series of digital voltage samples representing a waveform of the inputted Link 16 transmission RF signal; a digital 1060 MHz oscillator configured to produce a series of digital voltage samples representing a 1060 MHz waveform and a first digital multiplier, in operative communication with the A/D convertor and the digital 1060 MHz oscillator, configured to digitally multiply digital voltage samples from the A/D convertor and digital voltage samples from the digital 1060 MHz oscillator to produce a series of digital voltage samples.

Another embodiment provides such a Link 16 compliance monitoring system, further comprising a first decimator, in operative communication with the first digital multiplier, configured to decimate, by a prescribed decimation factor, the series of digital voltage samples produced by the first digital multiplier.

A further embodiment provides such a Link 16 compliance monitoring system, wherein the prescribed decimation factor in the first decimator is 8.

Yet another embodiment provides such a Link 16 compliance monitoring system, further comprising: a digital 30 MHz oscillator configured to produce a series of digital voltage samples representing a 30 MHz waveform; a second digital multiplier, in operative communication with the first digital multiplier and the digital 30 MHz oscillator, configured to digitally multiply a digital voltage sample from the first digital multiplier and a digital voltage sample from the digital 30 MHz oscillator; a first low-pass filter, in operative communication with the second digital multiplier, configured to receive and attenuate an output thereof; a first power detector, in operative communication with the first low-pass filter, configured to receive a digital voltage sample therefrom to calculate a power level sample based thereon; a first integrator, in operative communication with the first power detector, configured to sum a plurality of power level samples therefrom; a first conjugator, configured to produce a series of digital voltage samples representing a 30 MHz waveform that is the complex conjugate of the 30 MHz waveform produced by the digital 30 MHz oscillator; a third digital multiplier, in operative communication with the first digital multiplier and the first conjugator, configured to digitally multiply a digital voltage sample from the first digital multiplier and a digital voltage sample from the first conjugator; a second low-pass filter, in operative communication with the third digital multiplier, configured to receive and attenuate an output thereof; a second power detector, in operative communication with the second low-pass filter, configured to receive a digital voltage sample therefrom to calculate a power level sample based thereon; and a second integrator, in operative communication with the second power detector, configured to sum a plurality of power level samples therefrom.

A yet further embodiment provides such a Link 16 compliance monitoring system, further comprising a second decimator, in operative communication with the first decimator, configured to further decimate, by a decimation factor of 2, the series of digital voltage samples produced by the first decimator.

Still another embodiment provides such a Link 16 compliance monitoring system, wherein the first and second low-pass filters are 7 MHz low-pass filters.

A still further embodiment provides such a Link 16 compliance monitoring system, further comprising; a first delaying element, in operative communication with the first digital multiplier, configured to receive a digital voltage sample from the first digital multiplier and to output said digital voltage sample after a prescribed time delay; a second conjugator, in operative communication with the first delaying element, configured to produce a digital voltage sample that is the complex conjugate of a digital voltage sample received from the first delaying element; a fourth digital multiplier, in operative communication with the first digital multiplier and the second conjugator, configured to digitally multiply a digital voltage sample from the first digital multiplier and a digital voltage sample from the second conjugator; and a third integrator, in operative communication with the fourth digital multiplier, configured to sum a plurality of samples therefrom.

Even another embodiment provides such a Link 16 compliance monitoring system, further comprising a frequency bin mapper, in operative communication with the third integrator, configured to identify a frequency of the Link 16 transmission RF signal based on an output of the third integrator.

An even further embodiment provides such a Link 16 compliance monitoring system, further comprising: a third power detector, in operative communication with the first digital multiplier, configured to receive a digital voltage sample therefrom to calculate a power level sample based thereon; a first comparator, in operative communication with the third power detector, configured to compare a power level sample outputted thereby to a prescribed threshold value that is set in advance; a first counter, configured as a free-running counter that produces counter values that increment with the passage of time; a first counter min/max tracker, in operative communication with the first comparator and the first counter, configured to identify the minimum counter value of times at which a power level sample exceeds the prescribed threshold value in the first comparator, to identify the maximum counter value of times at which a power level sample exceeds the prescribed threshold value in the first comparator, and to output the identified minimum counter value and the identified maximum counter value; an averager, in operative communication with the counter min/max tracker, configured to calculate and output a mean value of the minimum counter value and the maximum counter value received therefrom; a second delaying element, in operative communication with the first counter, configured to receive a counter value therefrom and to output said counter value after a prescribed time delay; a central sample identifier, in operative communication with the averager and the second delaying element, configured to identify counter values, from the second delaying element, that are within a prescribed difference from the mean value from the averager; a third delaying element, in operative communication with the third power detector, configured to receive a power level sample therefrom and to output said power level sample after a time delay that is identical to the time delay of the second delaying element; a fourth integrator, in operative communication with the third delaying element, configured to sum a plurality of power level samples therefrom; a fourth delaying element, in operative communication with the third power detector, configured to receive a power level sample therefrom and to output said power level sample after a total time delay that is twice the time delay of the second delaying element; and a second comparator, in operative communication with the fourth delaying element and the fourth integrator, configured to compare a power level sample from the fourth delaying element to a threshold value that is set based on a summation value from the fourth integrator, to identify a power level sample that is greater than said threshold value.

A still even another embodiment provides such a Link 16 compliance monitoring system 9, further comprising a second counter for counting a frequency with which the second comparator identifies power level samples that are greater than the threshold value of the second comparator.

A still even further embodiment provides such a Link 16 compliance monitoring system, further comprising: a fifth delaying element, in operative communication with the first counter, configured to receive a counter value therefrom and to output said counter value after a prescribed total time delay that is twice the time delay of the second delaying element; and a second counter min/max tracker, in operative communication with the second comparator and the first counter, through the fifth delaying element, configured to identify the minimum counter value of times at which a power level sample from the fourth integrator exceeds the prescribed threshold value in the second comparator, and to identify the maximum counter value of times at which a power level sample from the fourth integrator exceeds the prescribed threshold value in the second comparator.

Still yet another embodiment provides such a Link 16 compliance monitoring system wherein the central sample identifier is configured such that the counter values, from the second delaying element, that are identified as being within a prescribed difference from the mean value from the averager are those that, in consideration of the frequency of the first counter, are within a prescribed time interval from the mean value, where the prescribed time interval is no less than 1.6 microseconds.

A still yet further embodiment provides such a Link 16 compliance monitoring system, further comprising: a first delaying element, in operative communication with the first digital multiplier, configured to receive a digital voltage sample from the first digital multiplier and to output said digital voltage sample after a prescribed time delay; a second conjugator, in operative communication with the first delaying element, configured to produce a digital voltage sample that is a complex conjugate of a digital voltage sample received from the first delaying element; a fourth digital multiplier, in operative communication with the first digital multiplier and the second conjugator, configured to digitally multiply a digital voltage sample from the first digital multiplier and a digital voltage sample from the second conjugator; a third integrator, in operative communication with the fourth digital multiplier, configured to sum a plurality of samples therefrom; a third power detector, in operative communication with the first digital multiplier, configured to receive a digital voltage sample therefrom to calculate a power level sample based thereon; a first comparator, in operative communication with the third power detector, configured to compare a power level sample outputted thereby to a prescribed threshold value that is set in advance; a first counter, configured as a free-running counter that produces counter values that increment with the passage of time; a first counter min/max tracker, in operative communication with the first comparator and the first counter, configured to identify the minimum counter value of times at which a power level sample exceeds the prescribed threshold value in the first comparator, to identify the maximum counter value of times at which a power level sample exceeds the prescribed threshold value in the first comparator, and to output the identified minimum counter value and the identified maximum counter value; an averager, in operative communication with the counter min/max tracker, configured to calculate and output a mean value of the minimum counter value and the maximum counter value received therefrom; a second delaying element, in operative communication with the first counter, configured to receive a counter value therefrom and to output said counter value after a prescribed time delay; a central sample identifier, in operative communication with the averager and the second delaying element, configured to identify counter values, from the second delaying element, that are within a prescribed difference from the mean value from the averager; a third delaying element, in operative communication with the third power detector, configured to receive a power level sample therefrom and to output said power level sample after a time delay that is identical to the time delay of the second delaying element; a fourth integrator, in operative communication with the third delaying element, configured to sum a plurality of power level samples therefrom; a fourth delaying element, in operative communication with the third power detector, configured to receive a power level sample therefrom and to output said power level sample after a total time delay that is twice the time delay of the second delaying element; and a second comparator, in operative communication with the fourth delaying element and the fourth integrator, configured to compare a power level sample from the fourth delaying element to a threshold value that is set based on a summation value from the fourth integrator, to identify a power level sample that is greater than said threshold value.

Even yet another embodiment provides such a Link 16 compliance monitoring system, further comprising a frequency bin mapper, in operative communication with the third integrator, configured to identify a frequency of the Link 16 transmission RF signal based on an output of the third integrator.

An even yet further embodiment provides such a Link 16 compliance monitoring system, further comprising a second counter for counting a frequency with which the second comparator identifies power level samples that are greater than the threshold value of the second comparator.

Still even yet another embodiment provides such a Link 16 compliance monitoring system, further comprising: a fifth delaying element, in operative communication with the first counter, configured to receive a counter value therefrom and to output said counter value after a prescribed total time delay that is twice the time delay of the second delaying element; and a second counter min/max tracker, in operative communication with the second comparator and the first counter, through the fifth delaying element, configured to identify the minimum counter value of times at which a power level sample from the fourth integrator exceeds the prescribed threshold value in the second comparator, and to identify the maximum counter value of times at which a power level sample from the fourth integrator exceeds the prescribed threshold value in the second comparator.

A still even yet further embodiment provides such a Link 16 compliance monitoring system, wherein the central sample identifier is configured such that the counter values, from the second delaying element, that are identified as being within a prescribed difference from the mean value from the averager are those that, in consideration of the frequency of the first counter, are within a prescribed time interval from the mean value, where the prescribed time interval is no less than 1.6 microseconds.

Yet still even another embodiment provides a semiconductor integrated circuit for monitoring Link 16 compliance, comprising such a Link 16 compliance monitoring system.

The details of one or more implementations are set forth in the accompanying drawings and the description below. Other features will be apparent from the description and drawings, and from the claims.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, rather than to limit the scope of the inventive subject matter.

BRIEF DESCRIPTIONS OF THE DRAWINGS

FIG. 2 is a schematic diagram showing a system for monitoring Link 16 compliance according to embodiments.

FIG. 6 is a schematic diagram showing a pulse width monitoring subsystem according to embodiments.

DETAILED DESCRIPTION

Figure 1:
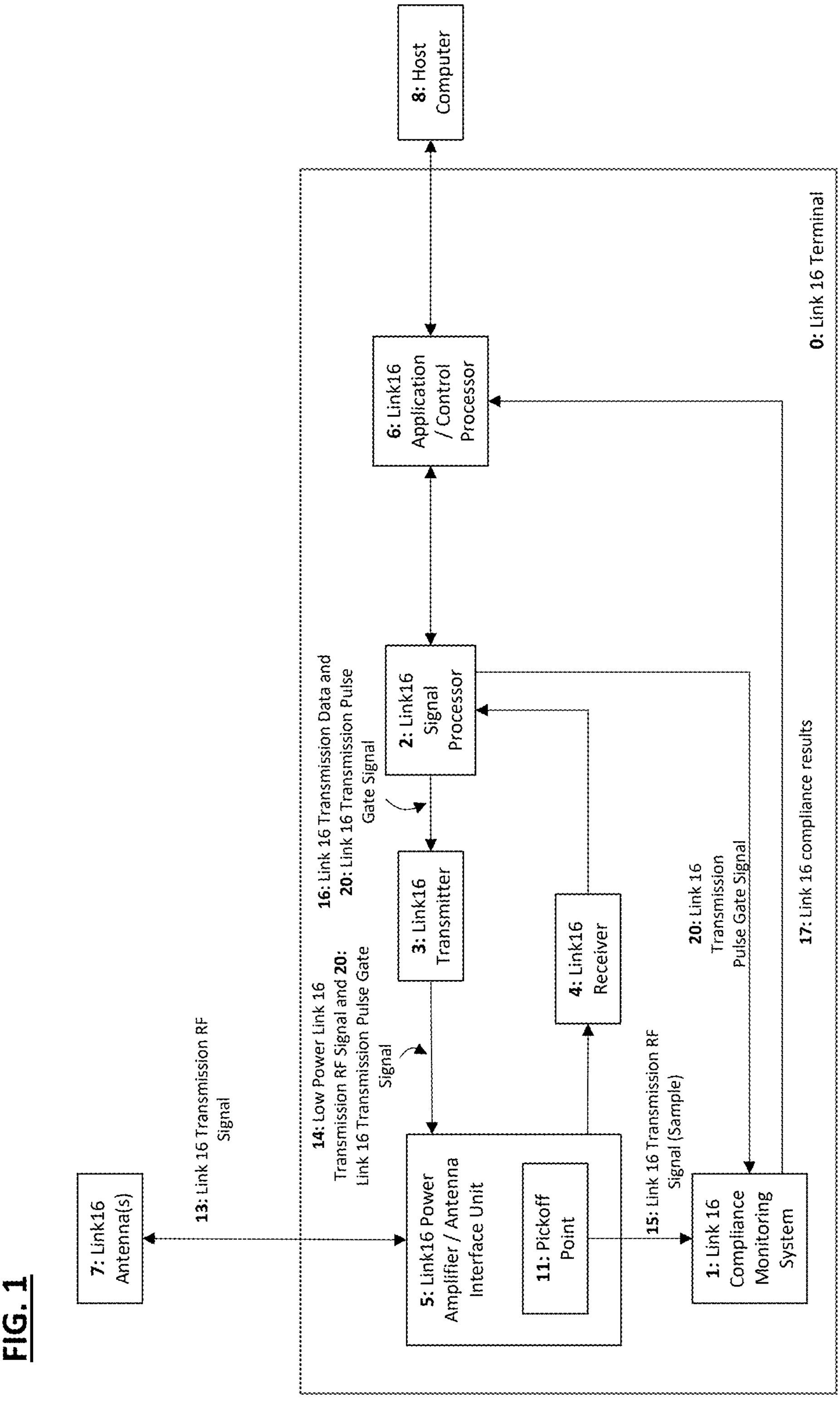
FIG. 1 is a schematic diagram showing a Link 16 terminal of an embodiment, as the environment in which a Link 16 compliance monitoring system operates.

The present disclosure is a system and semiconductor integrated circuit for monitoring Link 16 compliance, configured for use in a Link 16 terminal 0 as depicted in FIG. 1. The Link 16 terminal 0 will be described below as the context in which the Link 16 compliance monitoring system 1 operates.

As depicted in FIG. 1, the Link 16 terminal 0 is configured to intermediate between a host computer 8 and one or more Link 16 antennas 7, and comprises a Link 16 application/control processor 6 that is configured to control the Link 16 terminal 0 by receiving commands from the host computer 8 and sending commands to a Link 16 signal processor 2, and also to receive outputs from the Link 16 signal processor 2 and the Link 16 compliance monitoring system 1 to forward them to the host computer 8. The Link 16 signal processor 2, based on commands from the Link 16 application/control processor 6, generates Link 16 transmission data 16 and Link 16 transmission pulse gate signals 20, described in greater detail below. The Link 16 transmission data 16 is converted, by a Link 16 transmitter 3, into low-power Link 16 transmission RF signals 14, which are applied to a Link 16 power amplifier/antenna interface unit 5, to be amplified into a Link 16 transmission RF signal 13, gated by the Link 16 transmission pulse gate signal 20, to be emitted from one or more Link 16 antennas 7.

Signals received by the one or more Link 16 antennas 7 are amplified by the Link 16 power amplifier/antenna interface unit 5, and applied to a Link 16 receiver 4, and are then processed by the Link 16 signal processor 2, to be sent to the host computer 8 through the Link 16 application/control processor 6.

The Link 16 power amplifier/antenna interface unit 5, comprises a sampling point, known as a "pickoff point" 11, for sampling the Link 16 transmission RF signal, producing Link 16 transmission RF signals (samples) 15 to be used by the Link 16 compliance monitoring system 1 in monitoring Link 16 compliance. As will be described in detail below, the Link 16 compliance monitoring system 1 also receives the Link 16 transmission pulse gate signal 20 from the Link 16 signal processor and, through the structures and methods described below, monitors Link 16 compliance, to produce Link 16 compliance results 17 (comprising 1030 LLD result data 205, 1090 LLD result data 207, frequency bin result data 305, and pulse width result data 405, described below), which are forwarded through the Link 16 application/control processor 6 to the host computer 8.

Having described the context in which Link 16 monitoring is to be carried out, let us now turn our attention to embodiments of the Link 16 compliance monitoring system 1. As depicted in FIG. 2, the Link 16 compliance monitoring system 1 according to embodiments comprises four main subsystems: a frontend subsystem 100, an LLD monitoring subsystem 200, a frequency bin monitoring subsystem 300, and a pulse width monitoring subsystem 400.

Figure 3:
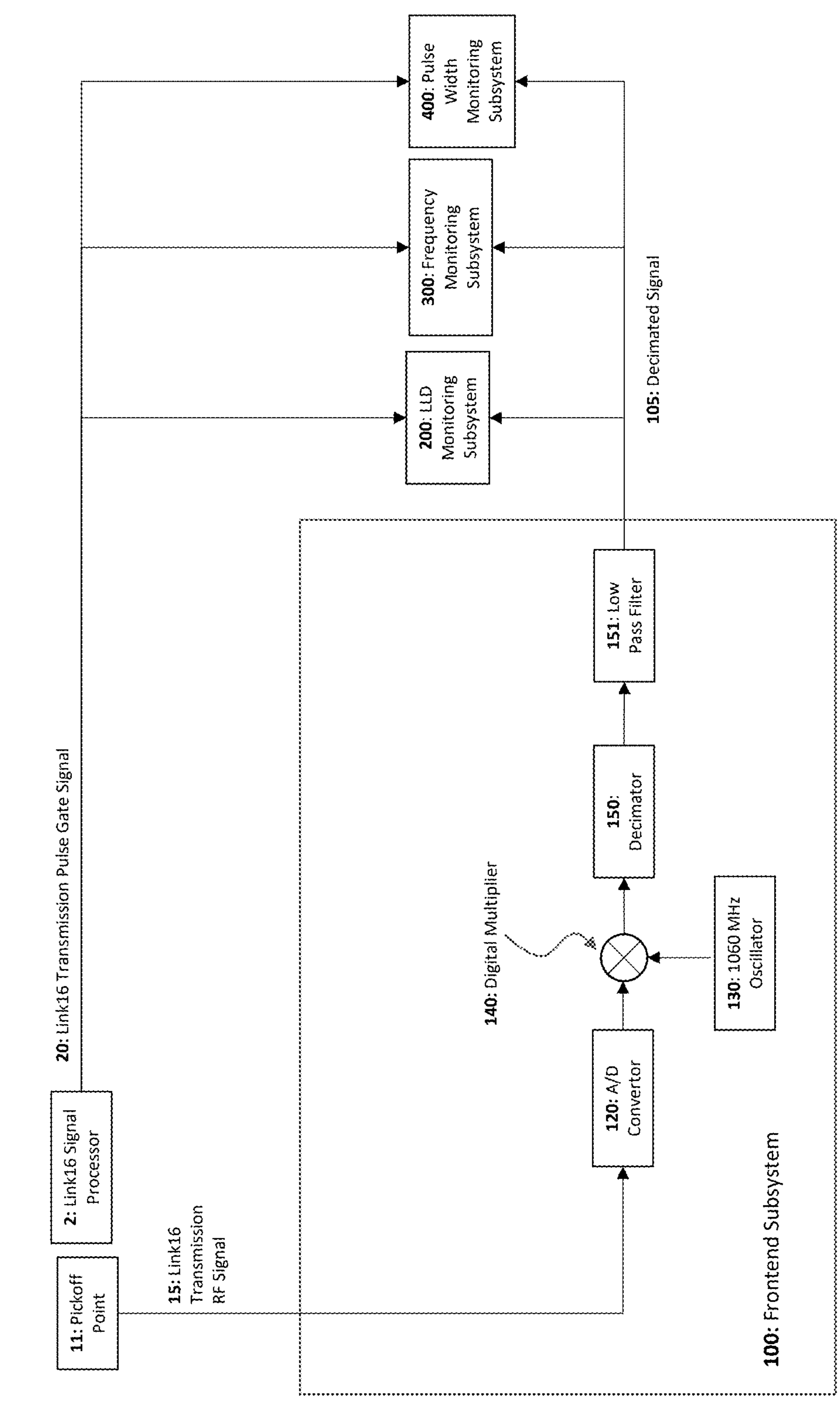
FIG. 3 is a schematic diagram showing a frontend subsystem according to embodiments.

In embodiments, the frontend subsystem 100, described in greater detail below in reference to FIG. 3, is configured to receive, from a pickoff point 11, a Link 16 transmission RF signal 15, which is the signal that the Link 16 system is to transmit via an antenna 7, and also to receive a Link 16 transmission pulse gate signal 20, which is a signal produced by the Link 16 signal processor 2 commanding transmission of a Link 16 system pulse. In embodiments, the pickoff point 11 is configured so as to satisfy, for example, the requirements of AP1.4.2. 1.2.2. in DoD 4650.1-R1.

As will be described below, in embodiments the frontend subsystem 100 is configured to output, to the other subsystems, a decimated signal 105, explained below. The Link 16 transmission pulse gate signal 20 is provided to the monitoring subsystems to provide a reference for signal sampling.

In embodiments, the LLD monitoring subsystem 200, described in greater detail below, is configured to accept the decimated signal 105 and the gate signal 20, to process these signals to produce a 1030 LLD result data signal 205 and a 1090 LLD result data signal 207, which are returned to the Link 16 Application/Control Processor 6 for further analysis to satisfy the requirements of AP1.4.2.1.2. of DoD 4650.1-R1.

In embodiments, the frequency bin monitoring subsystem 300, described in greater detail below, is configured to accept the decimated signal 105 and the gate signal 20, to process these signals to produce a frequency bin result data signal 305, which is returned to the Link 16 Application/Control Processor 6 for further analysis to satisfy various histogram-related requirements in DoD 4650.1-R1, such as in AP1.4.2.1.4.

In embodiments, the pulse width monitoring subsystem 400, described in greater detail below, is configured to accept the decimated signal 105 and the gate signal 20, to process these signals to produce a pulse width result data signal 405, which is returned to the Link 16 Application/Control Processor 6 for further analysis to satisfy various pulse width-related requirements in AP1.4.2.1.3. of DoD 4650.1-R1.

In embodiments the frontend subsystem 100, the LLD monitoring subsystem 200, the frequency bin monitoring subsystem 300, and the pulse width monitoring subsystem 400 are all built into a single chip in a single FPGA (Field Programmable Gate Array) in, for example, an IP such as the AMD ZU43DR. In embodiments these subsystems are the exclusive occupants of the FPGA, while in other embodiments other subsystems, not part of this disclosure, may share the FPGA. In embodiments the Link 16 compliance monitoring system 1 is the sole occupant of an integrated circuit chip that is dedicated thereto, while in other embodiments the Link 16 compliance monitoring system 1 shares the chip with other systems.

FIG. 3 depicts more detail of the frontend subsystem 100. In embodiments, this subsystem 100 an A/D converter 120, a 1060 MHz oscillator (first digital oscillator) 130, a digital multiplier 140 (first digital multiplier), and a decimator (first decimator) 150. In embodiments, the frontend subsystem 100 is built using an FPGA IP, as described above, while in other embodiments it may be built from, for example, dedicated semiconductor circuitry, or even from discrete analog and digital components. In embodiments, the Link 16 transmission RF signal 13 is gated by the Link 16 transmission pulse gate signal 20, which is provided to the monitoring subsystems 200, 300, and 400 to provide them a timing reference of when the transmission pulse is expected. Depending on the monitoring subsystem, the monitoring subsystem may monitor the Link 16 transmission RF signal 15 during an interval over which the Link 16 transmission pulse gate signal 20 is of a logical level that indicates a pulse (which, for convenience in explanation, hereinafter will be termed as being "during a pulse" of said signal). Conversely, the in some situations, as will be described below, the monitoring may be for the entire pulse repetition period. Note that the Link 16 transmission RF signal 13 is produced by the Link 16 terminal 0, and sampled, as the Link 16 Transmission RF signal (sample) 15, from what is termed a pickoff point 11 in compliance with the specifications outlined in DoD 4650.1-R1.

The frontend subsystem 100 also comprises an A/D converter 120. The A/D converter 120 may be structured using, for example, the AMD ZU43DR FPGA IP, referenced above. In embodiments, the digital sampling of the A/D conversion is performed at 2880 MHz, and in embodiments the sampling resolution may be 12 bits. In embodiments the A/D converter 120 is configured such that the expected amplitude of the Link 16 transmission RF signal 15 is less than the dynamic range of the A/D converter 120, enabling detection of RF signals that are greater than anticipated. In embodiments, the frontend subsystem 100 may further comprise an amplifier or attenuator, located prior to the input to the A/D converter 120, to enable matching of the Link 16 transmission RF signal 15 to less than the dynamic range of the A/D converter 120. In other embodiments, this matching to less than the dynamic range of the A/D converter 120 may be achieved through an external system. Obviously, any adjustments to the Link 16 transmission RF signal 15 must be reflected in calibration factors in the analytical processes later.

In embodiments, the frontend subsystem 100 further comprises a 1060 MHz oscillator 130 configured to generate a digital 1060 MHz sinusoidal waveform of an amplitude that is compatible with the dynamic input range of the digital multiplier 140, described below, producing signals with the same sampling rate as the output of the A/D converter 120, which, in embodiments, maybe 2880 MHz, as described above. In embodiments, the 1060 MHz oscillator 130 is numerically controlled. In embodiments the digital 1060 MHz waveform is a complex signal composed of a cosine wave for the in-phase mixer and a sine wave for the quadrature mixer. Note that although, strictly speaking, a digital signal is only an approximation of a sine or cosine wave, the meaning of "sine or cosine wave" here is that which can reasonably be considered to be a "sine wave" in the digital domain. In embodiments the 1060 MHz oscillator 130 may be structured from an analog oscillator combined with an A/D convertor to thereby form a 1060 MHz digital oscillator. In embodiments, the 1060 MHz oscillator 130 may be structured using, for example, the AMD ZU43DR FPGA IP, referenced above. In embodiments, the 1060 MHz oscillator 130 is a complex oscillator that produces a complex sine wave where the sequence of samples that define the sine wave have both in-phase (I) and quadrature (Q) components. In embodiments, the 1060 MHz oscillator 130 may be configured as a complex oscillator that produces a complex sine wave wherein the quadrature leads the in-phase signal by 90° (such as, for example, a complex sine wave wherein the in-phase signal is defined by $\sin(\alpha)$ and the quadrature is defined by $\cos(\alpha)$ (where a is an arbitrary phase angle) or the in-phase signal is defined by $\cos(\alpha)$ and the quadrature is defined by $-\sin(\alpha)$). In other embodiments, the 1060 MHz oscillator 130 may be configured as a complex oscillator that produces a complex sine wave wherein the quadrature lags the in-phase signal by 90° (such as, for example, a complex sine wave wherein the in-phase signal is defined by $\cos(\alpha)$ and the quadrature is defined by $\sin(\alpha)$ or the in-phase signal is defined by $\sin(\alpha)$ and the quadrature is defined by-$\cos(\alpha)$). The 1060 MHz oscillator ensures that any DC component from the output is not located in either the 1030 or 1090 passbands.

In embodiments, the frontend subsystem 100 further comprises a digital multiplier 140 that is configured to receive the output of the A/D converter 120 and the output of the 1060 MHz complex oscillator 130, to multiply these signals together to output the multiplicative result, doing so at the same sampling rate as the outputs of the A/D converter 120 and of the 1060 MHz oscillator 130, which, in embodiments, may be 2880 MHz. As is known to those skilled in the art, the signal that is produced includes frequency components of both the sums and the differences between the frequency components of the inputted signals. For example, digitally multiplying a 1025 MHz component in the signal from the A/D converter 120 with the 1060 MHz signal from the oscillator 130 will produce a signal with a 35 MHz component and a 2085 MHz component.

As is known to those that are skilled in the art, the power that is found in the low-frequency component will be proportional, at a known ratio, to the power of the inputted frequency component, enabling the power calculations that are required for Link 16 compliance monitoring to be carried out using only the low-frequency component in the waveform outputted from the digital multiplier 140, while ignoring (or filtering out) the high-frequency components that are produced. Specifically, the power of the resulting wave form, after multiplication, will be the product of each of the individual wave forms that are multiplied together. If the high-frequency component is filtered out, as it is by the low pass filter 151 in the embodiment illustrated in FIG. 3, only the low-frequency component will remain in the resulting wave form, reducing this power by half. Hence the power of the initial wave form can be calculated as $P_i=2P_o/P_{1060}$, where $P_i$ is the power of the inputted wave form (the Link 16 transmission RF signal 15), $P_{1060}$ is the power of the 1060 MHz sin wave produced by the 1060 MHz oscillator 130, and $P_o$ is the power of the low-frequency component of the resulting sine wave.

Given that the frequencies of interest in Link 16 compliance monitoring are only in the band from 960 to 1215 MHz, the multiplication with the 1060 MHz signal produces a signal where the highest frequency of interest will be only 155 MHz (1600 MHz less 1215 MHz). This enables a great reduction in calculation overhead and power consumption in subsequent mathematical handling. In embodiments, the digital multiplier 140 is a complex multiplier that is configured to multiply the output of the A/D converter 120 by a complex 1060 MHz signal (comprising an in-line component and a quadrature (imaginary) component) to produce a complex output signal. In embodiments, the digital multiplier 140 may be structured using the AMD ZU43DR FPGA IP.

In embodiments, the frontend subsystem 100 further comprises a decimator 150, configured to receive the output of the digital multiplier 140 and produce a signal with a sampling rate that has been decimated by, for example, 8. For example, if the sampling rate of the output of the digital multiplier 140 is 2880 MHz, the decimator 150 may be configured to produce a digital decimated signal with a sampling rate of 2880 MHz divided by 8=360 MHz, reducing the calculation overhead on the downstream processes by a factor of eight. In embodiments, the decimator may be of other than a factor of 8, such as a decimator that decimates by a factor of 2 or a decimator that decimates by a factor of 10, insofar as the resulting sampling rate is no less than the maximum frequency of interest calculated above, that being 155 MHz, and insofar as the frequency is at least the bandwidth required for frequency binning. Note that the benefit of the decimator is that of reduced calculation overhead and circuit complexity; in embodiments wherein there is no need for reduced calculation overhead and circuit complexity, the decimator 150 need not necessarily be provided. In embodiments the decimation is carried out through taking the average of sets of eight sequential samples, in which case the decimator 150 acts as a low-pass filter, eliminating the high-frequency component that was produced through the multiplication in the digital multiplier 140. In embodiments, a separate low-pass filter, not shown, may be provided between the digital multiplier 140 and the decimator 150. In yet other embodiments the decimator 150 may be achieved through merely sampling every eighth bit. In embodiments, the decimator 150 is in operative communication with the LLD monitoring subsystem 200, the frequency bin monitoring subsystem 300, and the pulse width monitoring subsystem 400, to provide a decimated signal 105 thereto. Note that while this signal 105 is termed a "decimated signal 105," in embodiments where the decimator 150 is not provided, this signal 105 will not be decimated. The term "decimated signal 105" should be understood to include such a case as well. In embodiments, the decimator 150 produces a complex decimated signal 105 by decimating a complex signal that is outputted from the digital multiplier 140. In embodiments, the decimator 150 may be structured using the AMD ZU43DR FPGA IP, described above.

Figure 4:
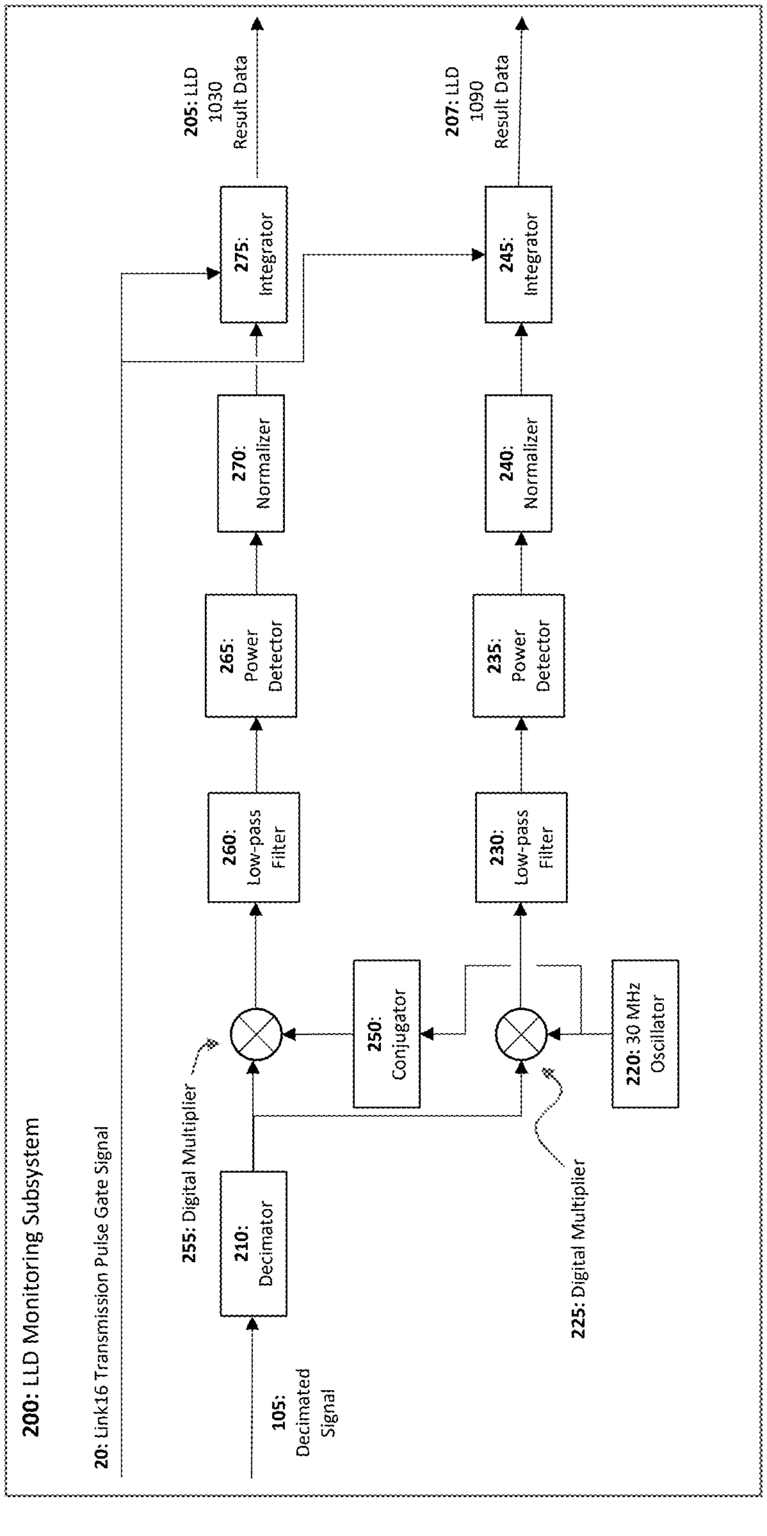
FIG. 4 is a schematic diagram showing an LLD monitoring subsystem according to embodiments.

As depicted in FIG. 2 and FIG. 3 and described above, the Link 16 compliance monitoring system further comprises an LLD monitoring subsystem 200. As depicted in FIG. 4, in embodiments the LLD monitoring subsystem 200 comprises a decimator (second decimator) 210, a 30 MHz oscillator 220, a digital multiplier (second digital multiplier) 225, a low-pass filter (first low-pass filter) 230, a power detector (first power detector) 235, a normalizer 240, an integrator (first integrator) 245, a conjugator (first conjugator) 250, a digital multiplier (third digital multiplier) 255, a low-pass filter (second low-pass filter) 260, a power detector (second power detector) 265, a normalizer 270, and an integrator (second integrator) 275.

The decimator 210 is configured to receive the decimated signal 105, from the decimator 150, to further decimate this signal, and operates similar to the decimator 150, described above. However, given that, in the LLD monitoring subsystem 200, the frequencies of interest are from 1023 MHz through 1037 MHz and 1083 MHz through 1097 MHz, which, in the decimated signal 105 after multiplication with the 1060 MHz signal from the oscillator 130, appear at 23 MHz to 37 MHz, the decimation by this decimator 210 is selected to be a 2× factor which reduces the clock rate to minimize sizing and power, but allows for a sufficiently high difference as to accurately represent the spectral content of the IFF bands. Note that the reason why, in embodiments, there is a separate decimator 210 in this subsystem from the decimator 150 in the frontend subsystem 100, described above, is because these frequencies are lower than some frequencies of interest in the other monitoring subsystems, enabling greater decimation in the LLD monitoring subsystem 200 than in the other subsystems. In embodiments, the decimator 210 decimates by two, and in embodiments the sampling frequency of the signal produced thereby may be 180 MHz. In other embodiments, the decimator 210 may be omitted. In embodiments, the decimator 210 may be structured using the AMD ZU43DR FPGA IP, referenced above.

The 30 MHz oscillator 220, similar to the 1060 MHz oscillator 130, described above in reference to FIG. 3, is configured to produce a 30 MHz sine wave signal. The 30 MHz oscillator 220 may or may not be numerically controlled. In embodiments, the 30 MHz oscillator 220 is configured to generate a 30 MHz complex sine wave signal, comprising an in-line component and a quadrature component. In embodiments, the 30 MHz oscillator 220 is configured similarly to the 1060 MHz oscillator 130 in that when the 1060 MHz oscillator 130 is configured so that the quadrature component will lag the in-line component, the 30 MHz oscillator 220 is also configured so that the quadrature component will lag the in-line component. Conversely, when the 1060 MHz oscillator 130 is configured so that the quadrature component will lead the in-line component, the 30 MHz oscillator 220 is also configured so that the quadrature component will lead the in-line component. In embodiments, the 30 MHz oscillator 220 is in operative communication, either directly or indirectly, with the digital multiplier 225 and the conjugator 250, described below. In embodiments, the sampling rate of the 30 MHz oscillator 220 is matched to the sampling rate of the decimator 210.

The digital multiplier 225, similar to the digital multiplier 140 that was described above in reference to FIG. 3, in embodiments is configured to receive an output signal of the 30 MHz oscillator 220 and an output signal of the decimator 210, to digitally multiply these signals together. As is known to those of ordinary skill in the art, the result of this multiplication, for noncomplex waveform inputs, will be an output signal that includes high- and low-frequency components that are the sums and the differences between the frequency components of the signal outputted from the decimator 210 and the sine wave waveform outputted from the 30 MHz oscillator 220. For example, in a case wherein the Link 16 transmission RF signal 15 includes a frequency component at 1095 MHz, the output of the digital multiplier 140 in the frontend subsystem 100 will include a high-frequency component at 2155 MHz and a low-frequency component at 35 MHz, where, after the 35 MHz low-frequency component is further multiplied digitally by the 30 MHz sine wave, from the 30 MHz oscillator 220, by the digital multiplier 225, components at 5 MHz and 65 MHz will be produced.

As is known to those of ordinary skill in the art, the result of this multiplication, for complex waveform inputs, will be somewhat different; when the output of the 1060 MHz oscillator 130 is a waveform wherein the quadrature leads the in-phase signal, the output will be one wherein the quadrature signal will lead the in-phase signal for the sum components (the high-frequency components in the output signal from the 1060 MHz oscillator 130). However, for the difference components (the low-frequency components in the output), the quadrature signal will lead the in-phase signal for those inputted frequency components with frequencies less than 1060 MHz, and will lag the in-phase signal for those frequency components with frequencies greater than 1060 MHz. For example, when a 1095 MHz signal component is multiplied by the digital multiplier 140 with a 1060 MHz signal wherein the quadrature leads the in-phase signal, the difference component will be a 35 MHz signal wherein the quadrature lags the in-phase signal. When this 35 MHz signal is subsequently multiplied (after decimation by the decimator 150 and the decimator 210) by the digital multiplier 225 with a 30 MHz signal wherein the quadrature lags the in-phase signal, the multiplication of the quadrature components will remove the 65 MHz sum component, leaving only a 5 MHz difference component (in addition to the high-frequency components described above). The combination of the digital multipliers 140 and 225 effectively maps input frequencies $f_{in}$ of between 1060 MHz and 1090 MHz to output frequencies $f_{out}$ of between 30 MHz and 0 MHz and input frequencies $f_{in}$>1090 MHz to output frequencies $f_{out}$ of $f_{in}$ minus 1090 MHz, with each of these low-frequency components having one quarter the power that was present in the corresponding frequency component in the inputted Link 16 transmission RF signal (minus power lost in transmission, which can be measured empirically and used as a compensation factor in subsequent analyses). In embodiments, the digital multiplier 225 may be structured using the AMD ZU43DR FPGA IP. In embodiments, the digital multiplier 225 is configured to perform its multiplication for each sample from the decimator 210, synchronized therewith.

In embodiments, the low-pass filter 230 is configured as a low-pass filter with a cutoff frequency of 7 MHz, in operative communication with the digital multiplier 225. The insertion of this 7 MHz low-pass filter enables selection of only signal components between 0 MHz and 7 MHz, corresponding to an input frequency $f_{in}$ of 1090 MHz±7 MHz. In embodiments, the low-pass filter 230 may be structured using the AMD ZU43DR FPGA IP using known techniques to produce the required bandwidth, roll-off characteristics, and group delay, etc., necessary to satisfy the requirements in DoD 4650.1-R1.

In embodiments the power detector 235 is configured to receive the output of the low-pass filter 230 and detect the instantaneous power of the waveform delivered thereby, doing so by calculating the sum of the square of the in-phase component and the square of the quadrature component for each sample received from the low-pass filter 230. In embodiments, the low-pass filter 230 may be structured using the AMD ZU43DR FPGA IP.

In embodiments, the normalizer 240 is configured to receive the output of the power detector 235 and multiply the detected power level by a scaling factor indicative of the period of time that is the multiplicative inverse of the sampling rate, to thereby calculate the amount of energy that is commensurate to the instantaneous power level that was detected by the power detector 235 where, in embodiments, the sampling rate in the LLD monitoring subsystem 200, after decimation by the decimator 210, may be 180 MHz. In other embodiments, the normalizer 240 may instead scale the output of the power detector 235 with an arbitrary scaling factor, to an appropriate level for the dynamic range of the integrator 245, described below. In other embodiments, the normalizer 240 may be omitted, with normalizing calculations carried out in the Link 16 control computer 10. In embodiments, the normalizer 240 may be structured using the AMD ZU43DR FPGA IP.

The integrator 245 is configured to receive the output from the normalizer 240 to sequentially sum each sample that is outputted thereby. In embodiments, the integrator 245 is configured so as to be resetted to 0 with the rising edge of the gate signal 107. With the purpose to include all energy in the pulse period, the system is resetted just prior to the end of a pulse repetition period (noting that for Link 16 a pulse repetition period is 13 microseconds). In embodiments, the integrator 245 is configured to send, to the Link 16 Application/Control Processor 6, an LLD 1090 result data 207, which is the result of summing of each of the values from the normalizer 240, upon the falling edge of the gate signal 107. In embodiments, the integrator 245 may be structured using the AMD ZU43DR FPGA IP.

Note that in embodiments the integrator 245 may be positioned between the power detector 235 and the normalizer 240 with the normalizer 240 acting on the output of the power detector 235.

In embodiments the conjugator 250 is configured to receive the output of the 30 MHz oscillator 220 and to produce the complex conjugate thereof (that is, to produce a 30 MHz sine wave waveform wherein the quadrature signal is the additive inverse of the quadrature signal of the 30 MHz sine wave signal that is outputted by the 30 MHz oscillator 220). When, for example, the quadrature signal from the 30 MHz oscillator 220 leads the in-phase signal for a signal component, this conjugator 250 causes the quadrature signal to lag the in-phase signal instead. Conversely, when the quadrature signal from the 30 MHz oscillator 220 lags the in-phase signal for a signal component, this conjugator 250 causes the quadrature signal to lead the in-phase signal instead. In other embodiments the conjugator 250 may be structured from another 30 MHz oscillator that is configured to produce the complex conjugate of the waveform produced by the 30 MHz oscillator 220, without actually being in operative communication with the 30 MHz oscillator 200. In embodiments, the conjugator 250 may be structured using the AMD ZU43DR FPGA IP.

The digital multiplier 255 is configured similarly to the digital multiplier 225, described above, performing a similar function. However, because the oscillator signal that is multiplied with the output of the decimator 210 has had the quadrature thereof inverted by the conjugator 250, the result of the multiplication will be somewhat different. Again taking an example wherein the output of the 1060 MHz oscillator 130 is a waveform wherein the quadrature leads the in-phase signal, in the digital multiplier 255, as with the digital multiplier 225, the quadrature signal, for the difference components (the low-frequency components in the output from the decimator 210), will still lead the in-phase signal for those inputted frequency components with frequencies less than 1060 MHz, and will lag the in-phase signal for those frequency components with frequencies greater than 1060 MHz. For example, when a 1025 MHz signal component is multiplied by the digital multiplier 140 with a 1060 MHz signal wherein the quadrature lags the in-phase signal, the difference component will be a 35 MHz signal wherein the quadrature leads the in-phase signal. When this 35 MHz signal is subsequently multiplied (after decimation by the decimator 150 and the decimator 210) by the digital multiplier 255 with a 30 MHz signal wherein the quadrature has been inverted to lead the in-phase signal, the multiplication of the quadrature components will remove the 65 MHz sum component, again leaving only a 5 MHz difference component (in addition to the high-frequency components described above). In this case the combination of the digital multipliers 140 and 255 effectively maps input frequencies $f_{in}$<1030 MHz to output frequencies $f_{out}$ of 1030 MHz minus $f_{in}$ and input frequencies $f_{in}$ of between 1030 MHz and 1060 MHz to output frequencies $f_{out}$ of between 0 MHz and 30 MHz, with each of these low-frequency components having one quarter the power that was present in the corresponding frequency component in the inputted Link 16 transmission RF signal (minus power lost in transmission, which can be measured empirically and used as a compensation factor in subsequent analyses). In embodiments, the digital multiplier 255 may be structured using the AMD ZU43DR FPGA IP. In embodiments, the digital multiplier 255 is configured to perform its multiplication for each sample from the decimator 210, synchronized therewith.

In embodiments the low-pass filter 260 is configured to receive the output of the digital multiplier 255, and may be structured identically to the low-pass filter 230, described above, to perform identical functions. Redundant explanations are omitted here.

In embodiments, the power detector 265 is configured to receive the output of the low-pass filter 260, and may be structured identically to the power detector 235, described above, to perform identical functions. Redundant explanations are omitted here.

In embodiments, the normalizer 270 is configured to receive the output of the power detector 265, and may be structured identically to the normalizer 240, described above, to perform identical functions. Redundant explanations are omitted here.

In embodiments, the integrator 275 is configured to receive the output of the normalizer 270, and may be structured identically to the integrator 245, described above, to perform identical functions, and to output the LLD 1030 signal to the Link 16 Application/Control Processor 6. Redundant explanations are omitted here.

The Link 16 Application/Control Processor 6 is configured to receive the LLD 1090 result data 207 from the integrator 245 and the LLD 1030 result data 205 from the integrator 275, as signals correlated with the total amounts of energy, over the Link 16 pulse repetition period of the Link 16, in the 1090±7 MHz band and the 1030±7 MHz band, respectively, in the Link 16 transmission RF signal 15. The Link 16 Application/Control Processor 6 is configured to increment a 1030/1090 MHz Event count (not shown) if, during a transmit pulse period interval, the measured energy within 7 MHz of 1030 or 1090 MHz exceeds a reference energy level as defined in DoD 4650.1-R1. Here, in embodiments, the reference energy level is set to reflect the insertion loss and filter characteristics of the RF frontend subsystem 100 and pickoff point 11 In embodiments, the Link 16 Application/Control Processor 6 is further configured to generate an LLD EPF Fault Report (and increment an EPF Fault Report count) if five or more 1030/1090 MHz Event counts occur during a time slot, as defined in DoD 4650.1-R1. The Link 16 Application/Control Processor 6 is further configured to satisfy the requirements of AP1.4.2.1.2.4. in DoD 4650.1-R1.

Note also that a clock signal, not illustrated, may be provided to all of the components of the LLD monitoring system 210, illustrated in FIG. 4, to synchronize these elements with the sampling frequency of the decimator 210.

Figure 5:
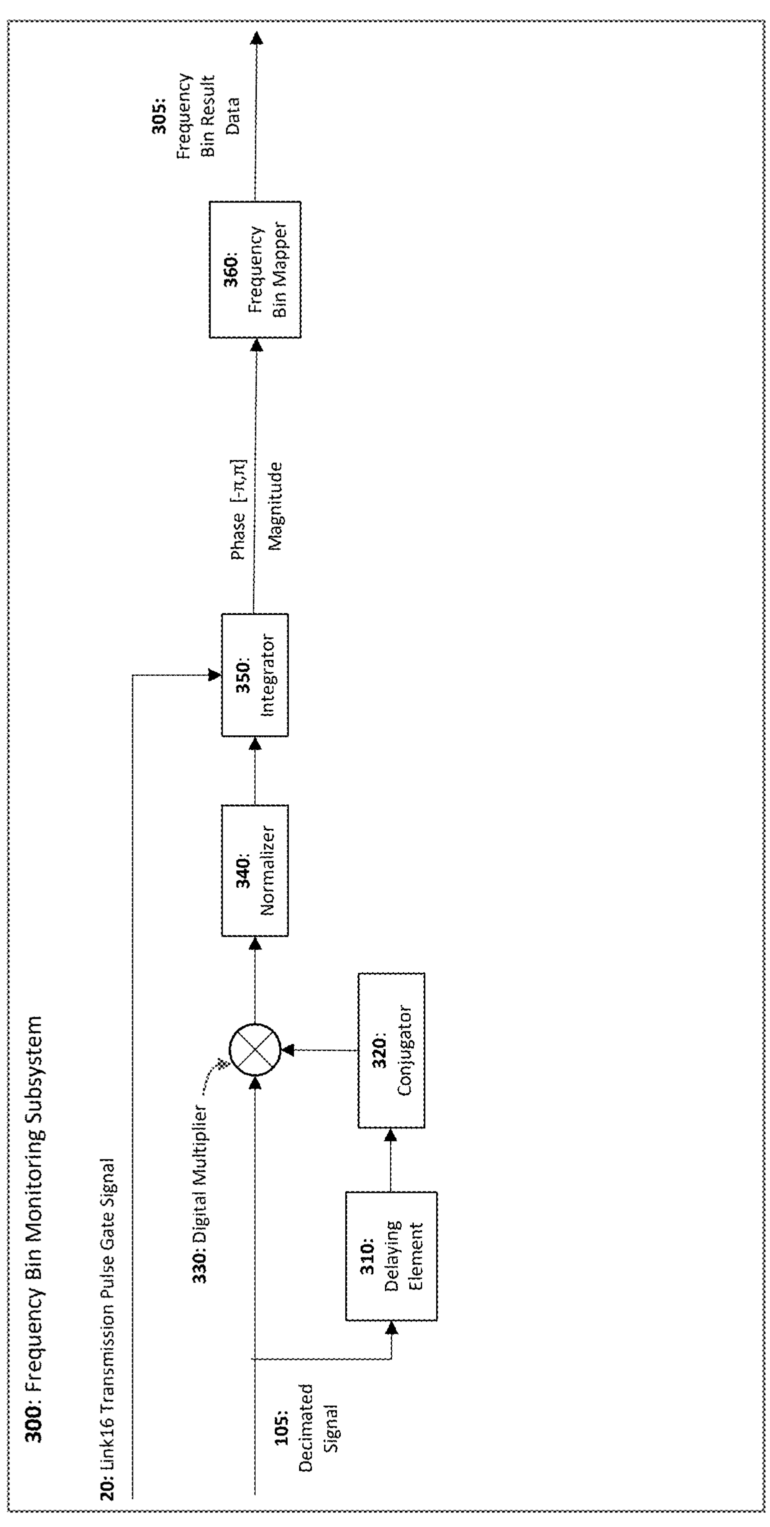
FIG. 5 is a schematic diagram showing a frequency bin monitoring subsystem according to embodiments.

As depicted in FIG. 2, in embodiments the Link 16 compliance monitoring system 1 further comprises a frequency bin monitoring subsystem 300, which will be explained in detail in reference to FIG. 5. As depicted in FIG. 5, in embodiments the frequency bin monitoring subsystem 300 comprises a delaying element (first delaying element) 310, a conjugator (second conjugator) 320, a digital multiplier (fourth digital multiplier) 330, a normalizer 340, an integrator (third integrator) 350, and a frequency bin mapper 360, which may all be structured using, for example, the AMD ZU43DR FPGA IP.

In embodiments, the delaying element 310 is configured to receive the decimated signal 105 from the decimator 150 of the frontend subsystem 100, and to delay that decimated signal 105 by an arbitrary delay time before outputting the delayed and decimated signal to a conjugator 320. In embodiments, the conjugator 320 is similar to the conjugator 250, described above, and is configured to accept the delayed and decimated signal from the delaying element 310 to produce a conjugate signal thereof (that is, to produce a signal wherein the quadrature component has been subjected to additive inversion). In embodiments, the conjugator 320 is in operative communication with the digital multiplier 330, so as to output the conjugated signal to the digital multiplier 330.

The digital multiplier 330 is similar to the digital multipliers 140, 225, and 255, described above, and in embodiments is configured to receive the decimated signal 105 from the decimator 150 of the frontend subsystem 100, along with the delayed and conjugated signal from the conjugator 320, to multiply these signals together through complex digital multiplication, as described above. In embodiments, the result is a waveform that has a magnitude (in-phase component) and phase (quadrature component) that are functions of the frequency and phase of the decimated signal 105, which are functions of the dominant input frequency in the Link 16 transmission RF signal 15, as will be described below.

In embodiments, the normalizer 340 is similar to the normalizers 240 and 270, described above, and is configured so as to receive the signal outputted from the digital multiplier 330 and multiply the signal received therefrom by a scaling factor indicative of the period of time that is the multiplicative inverse of the sampling rate, to thereby normalize the magnitude of this signal based on the time period over which the pulse is applied. In other embodiments, the normalizer 340 may instead scale the output of the digital multiplier 330, with an arbitrary scaling factor, to an appropriate level for the dynamic range of the integrator 350, described below. In other embodiments, the normalizer 340 may be omitted, with the frequency bin mapper 360, described below, configured to perform frequency bin mapping using non-normalized values.

In embodiments, the integrator 350 is configured similarly to the integrators 245 and 275, described above, to sum the values of the voltage samples outputted from the normalizer 340 or the digital multiplier 330 over the interval of the pulse, and, like the integrators 245 and 275, with the rising edge or the falling edge of the gate signal 107 outputs the value thereof to the frequency bin mapper 360 and is resetted to 0. In other embodiments, a power detector, not shown, is provided between the digital multiplier 330 and the integrator 350, and the integrator 350 is configured to sum the values of power samples outputted thereby.

In embodiments, the signal that is outputted from the integrator 350 is a complex signal, with an in-phase component and a quadrature component. In other embodiments, the signal that is outputted from the integrator 350 is a noncomplex value representing the sum of the in-phase components of the samples that were summed during the pulse of the gate signal 107. In other embodiments the signal that is outputted from the integrator 350 is a noncomplex value representing the sum of the quadrature components of the samples that were summed during the pulse of the gate signal 107. In yet other embodiments, a power detector, not numbered, but similar to the power detectors 235 and 265, set forth above, may be provided between the digital multiplier 330 and the integrator 350, and the output of the integrator 350 may be a summation of the powers of the samples that were outputted by the digital multiplier 330.

The frequency bin mapper 360 is configured to receive the output of the integrator 350, and to identify, from the magnitude and/or phase data outputted from the integrator 350, the frequency $f_{in}$ of the Link 16 transmission RF signal 15 obtained from the pickoff point 11, as described above. Given that the magnitude of the in-phase component and the magnitude of the quadrature component, outputted from the integrator 350, are functions of the frequency $f_{in}$ of the Link 16 transmission RF signal 15, $f_{in}$ can be identified uniquely through the use of a lookup table or through a calculation in the frequency bin mapper 360. For example, multiple phase samples are stored for each pulse and the average frequency of the pulse can be calculated by measuring the difference in phase for each of the samples. In embodiments, the frequency bin mapper 360 is configured to identify, from the dominant input frequency $f_{in}$ during a pulse of the gate signal 107 the frequency bin, as defined in AP1.4.2.1.4.3. of DoD 4650.1-R1, that includes that input frequency $f_{in}$. In embodiments, the frequency bin mapper 360 is configured to output frequency bin result data 305 to the Link 16 Application/Control Processor 6. In other embodiments, the frequency bin mapper 360 is configured to output, to the Link 16 control computer 10, the dominant input frequency $f_{in}$ that is present during the interval of the pulse of the gate signal 107, with the Link 16 control computer 10 configured to map the dominant input frequency $f_{in}$ to a frequency bin. In yet other embodiments, the outputs of the integrator 350 themselves are forwarded directly to the Link 16 control computer 10 for analysis, with the frequency bin mapping function carried out within the Link 16 Application/Control Processor 6. The Link 16 Application/Control Processor 6 is configured so as to run a program to analyze frequency bin result data 305, or the dominant input frequency $f_{in}$, to carry out the analyses mandated in AP1.4.2.1.4. of DoD 4650.1-R1 to produce the OOB EPF Fault Report set forth in AP1.4.2.1.4.6.5. of DoD 4650.1-R1.

As depicted in FIG. 2, the Link 16 compliance monitoring system 1 further comprises a pulse width monitoring subsystem 400. As depicted in FIG. 6, in embodiments, the pulse width monitoring system 400 comprises a pulse center identifying unit 410, an average power identifying unit 420, and a pulse width measurer 430, along with a one-pulse delay element 440, a one-pulse delay element (third delaying element) 445, a one-pulse delay element (second delaying element) 450, a one-pulse delay element 455, a one-pulse delay element (fourth delaying element) 460, and a one-pulse delay element (fifth delaying element) 465, which, in embodiments, may be structured using the AMD ZU43DR FPGA IP.

In embodiments, the pulse center identifying unit 410, for identifying the center of the actual pulse that is transmitted (as opposed to the Link 16 transmission pulse gate signal 20 that identifies when the Link 16 Application/Control Processor 6 is calling for a pulse to be transmitted) comprises a power detector (third power detector) 4110, an initial threshold comparator (first comparator) 4120, a counter (first counter) 4130, a counter min/max tracker (first counter min/max tracker) 4140, and an averager 4150. The power detector 4110 is configured to receive each outputted decimated signal 105, outputted from the decimator 150 in the frontend subsystem 100, and to identify the power of the decimated signal 105 through calculating the sum of the square of the in-phase component and the square of the quadrature component, in the same manner as with the power detector 235 and the power detector 265 in the LLD monitoring subsystem 200, described above. In embodiments, the initial threshold comparator 4120 compares the output of the power detector 4110 to an initial threshold, to output a signal indicating that the detected power is within a set of thresholds to ensure that the subsequent monitoring subsystem will accurately measure the pulse. If the power measurement falls outside the window, the pulse is declared as faulty without requiring any further measurement. In embodiments, this initial threshold value may be set through a signal, not shown, from the Link 16 Application/Control Processor 6.

In embodiments the counter 4130 is a free-running digital counter, for outputting a signal that indicates a number of clock cycles that has elapsed since the counter 4130 has last been resetted. In embodiments, the counter 4130 may be resetted by the rising edge or the falling edge of the gate signal 107. In embodiments, the counter 4130 has a clock frequency of 360 MHz.

In embodiments, the counter min/max tracker 4140 is configured so as to receive the output of the initial threshold comparator 4120 and the output of the counter 4130, to record the minimum value of the counter 4130 when the output of the initial threshold comparator 4120 indicates that the power level detected by the power detector 4110 is first greater than the initial threshold value during a pulse of the gate signal 107, and to record the maximum value of the counter 4130 when the output of the initial threshold comparator 4120 indicates that the power level detected by the power detector 4110 is last greater than the initial threshold value during the pulse of the gate signal 107. In embodiments, the counter min/max tracker 4140 is configured to update the maximum value stored therein whenever the initial threshold comparator 4120 indicates that the detected power level is above the initial threshold value in combination with the value outputted from the counter 4130 being greater than the maximum value previously stored in the counter min/max tracker 4140. In embodiments the counter min/max tracker 4140 may be configured so that the values stored in the counter min/max tracker 4140 may be cleared on the rising edge or the falling edge of the gate signal 107. In embodiments, the counter min/max tracker 4140 is configured so as to output, to the averager 4150, described below, the minimum and maximum counter values detected thereby.

In embodiments, the averager 4150 is configured so as to receive the minimum and maximum counter values outputted from the counter min/max tracker 4140, and to output, to the central sample identifier 4230, described below, the value that is the midpoint between the minimum and maximum counter value.

As depicted in FIG. 6, the average power identifying unit 420 comprises a normalizer 4210, an integrator (fourth integrator) 4220, and a central sample identifier 4230. The average power identifying unit 420 is for identifying the average power of the decimated signal 105 in a central region of the actual pulse of the Link 16 transmission RF signal 15. In embodiments, the central sample identifier 4230 in the average power identifying unit 420 is configured to receive the counter value from the counter 4130 after a one-pulse delay (which, in embodiments, is 13 microseconds) through the one-pulse delay element 450. This one pulse delay is to provide time for the pulse center identifying unit 410 to identify the center of the pulse of the decimated signal 105. In embodiments, the central sample identifier 4230 is configured to compare the received counter value to a range that is the average value, from the averager 4150, ±N, where N is an arbitrary value that is small when compared to the expected width (number of samples) of the pulse in the decimated signal 105, to output, to an integrator 4220, described below, a signal indicating that the current sample, from the normalizer 4210, described below, is one of the 2N±1 samples that are at the center of the pulse of the decimated signal 105. In embodiments, the normalizer 4210, similar to the normalizers 240 and 270 in the LLD monitoring subsystem 200, is configured to receive the output of the power detector 4110, after a one-pulse delay through the one-pulse delay element 445, and to divide by 2N+1, outputting the normalized value to the integrator 4220. In embodiments, the integrator 4220, as with the integrators 245 and 275, described above, is configured to receive the signals outputted from the normalizer 4210 and sum the signals received therefrom during the interval wherein the central sample identifier 4230 is outputting a signal indicating that the counter value, delayed by one pulse by the one-pulse delay element 450, is within ±N of the center of the pulse of the decimated signal 105, which was calculated by the averager 4150. In embodiments, N is set, based on the frequency of the counter 4130, so that N times the period of the counter 4130 will be no less than 1.6 microseconds. For example, in embodiments where the frequency of the counter 4130 is 360 MHz, N may be set to 576. Thus the integrator 4220 outputs, to the comparator 4310, a value that is equal to the average power at the center of the pulse of the decimated signal 105. In embodiments the integrator 4220 outputs the summation value thereof and is resetted to zero with the rising edge or falling edge of the gate signal 107 that is delayed through a one-pulse delay element 440 that is configured to delay the gate signal 107 by a time equal to the time of a single pulse of the gate signal 107.

As depicted in FIG. 6, in embodiments the pulse width monitoring subsystem 400 comprises a pulse width measurer 430. In embodiments, the pulse width measurer 430 comprises a comparator (second comparator) 4310 and a counter (second counter) 4320. The comparator 4310 is configured to receive the power level, detected by the power detector 4110, of the decimated signal 105, after a delay that is equal to twice the pulse of the gate signal 107, through the one-pulse delay element 445 and the one-pulse delay element 460, which are each configured to delay the power detection sample from the power detector 4110 by a time equal to the length of the pulse of the gate signal 107, resulting in a delay that is equal to twice the length of the pulse of the gate signal 107. This delay is to provide time for the integrator 4220 to calculate the average power of the samples outputted by the power detector 4110 in the central region of the pulse of the decimated signal 105. In embodiments, the comparator 4310 is configured to compare the power level, received from the one-pulse delay element 460, to the value received from the integrator 4220×0.90 (where this 0.90 is to satisfy the requirement in AP1.4.2.1.3.3 of DoD 4650.1-R1.), to output a signal indicating whether or not the power level from the power detector 4110, after delays by the one-pulse delay element 445 and the one-pulse delay element 460, is greater than 0.90 times the average power in the central region of the pulse of the decimated signal 105, as calculated by the normalizer 4210 and integrator 4220. In other embodiments, the normalizer 4210 may be configured to further multiply the normalized values by 0.90 and output the result to the integrator 4220, with the comparator 4310 configured to compare the output of the one-pulse delay element 460 to the output of the integrator 4220 directly, without the comparator 4310 performing an additional calculation to take the 0.90× into account. In embodiments, the counter 4320 is configured to receive the output of the comparator 4310 and the values from the counter 4130, after delays through the one-pulse delay element 450 and the one-pulse delay element 465, to use the output of the one-pulse delay element 465 as a clock signal in counting the number of times, during the pulse interval of the gate signal 107, that the comparator 4310 indicates that the power level of the decimated signal 105 is above 0.90× the average power level in the central region of the pulse of the decimated signal 105, and configured to output this frequency, as the pulse width result data 405 for the decimated signal 105, doing so on the rising edge or falling edge of the delayed gate signal 107, to the Link 16 control computer 10. In other embodiments, the counter 4320 is configured to operate identically to the counter min/max tracker 4140, described above, to identify the minimum counter value and the maximum counter value for which the power level, outputted by the power detector 4110, is greater than 0.90 times the average power level in the central region of the pulse of the decimated signal 105, and configured to output, with the rising edge or falling edge of the delayed gate signal 107, the difference between the maximum counter value and the minimum counter value, as the pulse width result data 405 for the decimated signal 105, to the Link 16 control computer 10. In embodiments, the value of the counter 4320 is resetted by the rising edge or falling edge of the gate signal 107, after passing through the one-pulse delay element 440 and the one-pulse delay element 455. In embodiments the Link 16 control computer 10 is configured to execute processes to track a pulse width event count as per AP1.4.2.1.3.5 of DoD 4650.1-R1, and to generate a Pulse Width EPF Fault Report as per AP1.4.2.1.3.6. of DoD 4650.1-R1, based on outputs from the counter 4320.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other. For example, while in FIG. 6 the one-pulse delay element 440 and the one-pulse delay element 455 are illustrated as two separate elements, they may instead be combined into a single two pulse delay element. As another example, while in FIG. 6 the integrator 4220 received the output of the normalizer 4210, the sequence of these two elements may instead be reversed.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

It will also be understood that, when a feature or element is referred to as being "in operative communication with," "connected to", "attached to" or "coupled to" another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

EXPLANATIONS OF REFERENCE NUMERALS

0: Link 16 Terminal
1: Link 16 Compliance Monitoring System
2: Link16 Signal Processor
3: Link16 Transmitter
4: Link16 Receiver
5: Link16 Power Amplifier/Antenna Interface Unit
6: Link16 Application/Control Processor
7: Link16 Antenna(s)
8: Host Computer
11: Pickoff Point
13: Link 16 Transmission RF Signal
14: Low Power Link 16 Transmission RF Signal
15: Link 16 Transmission RF Signal (Sample)
16: Link 16 Transmission Data
17: Link 16 Compliance Results
20: Link 16 Transmission Pulse Gate Signal
100: Frontend Subsystem
105: Decimated Signal
107: Gate Signal
110: Gate
120: A/D Converter

130: 1060 MHz Oscillator
140: Digital Multiplier (First Digital Multiplier)
150: Decimator
200: LLD Monitoring Subsystem
205: 1030 LLD Result Data
207: 1090 LLD Result Data
210: Decimator
220: 30 MHz Oscillator
225: Digital Multiplier
230: Low-Pass Filter
235: Power Detector
240: Normalizer
245: Integrator
250: Conjugator
255: Digital Multiplier
260: Low-Pass Filter
265: Power Detector
270: Normalizer
275: Integrator
300: Frequency Bin Monitoring Subsystem
305: Frequency Bin Result Data
310: Delaying Element
320: Conjugator
330: Digital Multiplier
340: Normalizer
350: Integrator
360: Frequency Bin Mapper
400: Pulse Width Monitoring Subsystem
405: Pulse Width Result Data
410: Pulse Center Identifying Unit
4110: Power Detector
4120: Initial Threshold Comparator
4130: Counter
4140: Counter Min/Max Tracker
4150: Averager
420: Average Power Identifying Unit
4210: Normalizer
4220: Integrator
4230: Central Sample Identifier
430: Pulse Width Measurer
4310: Comparator
4320: Counter
440: One-Pulse Delay Element
445: One-Pulse Delay Element
450: One-Pulse Delay Element
455: One-Pulse Delay Element
460: One-Pulse Delay Element
465: One-Pulse Delay Element

What is claimed is:

1. A Link 16 compliance monitoring system comprising:

an analog-digital (A/D) convertor configured to receive, and perform A/D conversion on, a Link 16 transmission radio frequency (RF) signal to produce a series of digital voltage samples representing a waveform of the inputted Link 16 transmission RF signal;

a digital 1060 MHz oscillator configured to produce a series of digital voltage samples representing a 1060 MHz waveform and a first digital multiplier, in operative communication with the A/D convertor and the digital 1060 MHz oscillator, configured to 10 digitally multiply digital voltage samples from the A/D convertor and digital voltage samples from the digital 1060 MHz oscillator to 12 produce a series of digital voltage samples.

2. The Link 16 compliance monitoring system set forth in claim 1, further comprising:

a first decimator, in operative communication with the first digital multiplier, configured to decimate, by a prescribed decimation factor, the series of digital voltage samples produced by the first digital multiplier.

3. The Link 16 compliance monitoring system set forth in claim 2, wherein:

the prescribed decimation factor in the first decimator is 8.

4. The Link 16 compliance monitoring system set forth in claim 1, further comprising:

a digital 30 MHz oscillator configured to produce a series of digital voltage samples representing a 30 MHz waveform;

a second digital multiplier, in operative communication with the first digital multiplier and the digital 30 MHz oscillator, configured to digitally multiply a digital voltage sample from the first digital multiplier and a digital voltage sample from the digital 30 MHz oscillator;

a first low-pass filter, in operative communication with the second digital multiplier, configured to receive and attenuate an output thereof;

a first power detector, in operative communication with the first low-pass filter, configured to receive a digital voltage sample therefrom to calculate a power level sample based thereon;

a first integrator, in operative communication with the first power detector, configured to sum a plurality of power level samples therefrom;

a first conjugator, configured to produce a series of digital voltage samples representing a 30 MHz waveform that is the complex 20 conjugate of the 30 MHz waveform produced by the digital 30 MHz oscillator;

a third digital multiplier, in operative communication with the first digital multiplier and the first conjugator, configured to 24 digitally multiply a digital voltage sample from the first digital multiplier and a digital voltage sample from the first conjugator;

a second low-pass filter, in operative communication with the third digital multiplier, configured to receive and attenuate an output thereof;

a second power detector, in operative communication with the second low-pass filter, configured to receive a digital voltage sample therefrom to calculate a power level sample based thereon; and a second integrator, in operative communication with the second power detector, configured to sum a plurality of power level samples therefrom.

5. The Link 16 compliance monitoring system set forth in claim 4, further comprising:

a second decimator, in operative communication with a first decimator, configured to further decimate, by a decimation factor of 2, the series of digital voltage samples produced by the first decimator.

6. The Link 16 compliance monitoring system set forth in claim 4, wherein:

the first and second low-pass filters are 7 MHz low-pass filters.

7. The Link 16 compliance monitoring system set forth in claim 1, further comprising:

a first delaying element, in operative communication with the first digital multiplier, configured to receive a digital voltage sample from the first digital multiplier and to output said digital voltage sample after a prescribed time delay;

a second conjugator, in operative communication with the first delaying element, configured to produce a digital voltage sample that is the complex conjugate of a digital voltage sample received from the first delaying element;

a fourth digital multiplier, in operative communication with the first digital multiplier and the second conjugator, configured to digitally multiply a digital voltage sample from the first digital multiplier and a digital voltage sample from the second conjugator; and a third integrator, in operative communication with the fourth digital multiplier, configured to sum a plurality of samples therefrom.

8. The Link 16 compliance monitoring system set forth in claim 7, further comprising:

a frequency bin mapper, in operative communication with the third integrator, configured to identify a frequency of the Link 16 transmission RF signal based on an output of the third integrator.

9. The Link 16 compliance monitoring system set forth in claim 1, further comprising:

a third power detector, in operative communication with the first digital multiplier, configured to receive a digital voltage sample therefrom to calculate a power level sample based thereon;

a first comparator, in operative communication with the third power detector, configured to compare a power level sample outputted thereby to a prescribed threshold value that is set in advance;

a first counter, configured as a free-running counter that produces counter values that increment with the passage of time;

a first counter min/max tracker, in operative communication with the first comparator and the first counter, configured to identify the minimum counter value of times at which a power level sample exceeds the prescribed threshold value in the first comparator, to identify the maximum counter value of times at which a power level sample exceeds the prescribed threshold value in the first comparator, and to output the identified minimum counter value and the identified maximum counter value;

an averager, in operative communication with the first counter min/max tracker, configured to calculate and output a mean value of the minimum counter value and the maximum counter value received therefrom;

a second delaying element, in operative communication with the first counter, configured to receive a counter value therefrom and to output said counter value after a prescribed time delay;

a central sample identifier, in operative communication with the averager and the second delaying element, configured to identify counter values, from the second delaying element, that are within a prescribed difference from the mean value from the averager;

a third delaying element, in operative communication with the third power detector, configured to receive a power level sample therefrom and to output said power level sample after a time delay that is identical to the time delay of the second delaying element;

a fourth integrator, in operative communication with the third delaying element, configured to sum a plurality of power level samples therefrom;

a fourth delaying element, in operative communication with the third power detector, configured to receive a power level sample therefrom and to output said power level sample after a total time delay that is twice the time delay of the second delaying element; and a second comparator, in operative communication with the fourth delaying element and the fourth integrator, configured to compare a power level sample from the fourth delaying element to a threshold value that is set based on a summation value from the fourth integrator, to identify a power level sample that is greater than said threshold value.

10. The Link 16 compliance monitoring system set forth in claim 9, further comprising:

a second counter for counting a frequency with which the second comparator identifies power level samples that are greater than the threshold value of the second comparator.

11. The Link 16 compliance monitoring system set forth in claim 9, further comprising:

a fifth delaying element, in operative communication with the first counter, configured to receive a counter value therefrom and to output said counter value after a prescribed total time delay that is twice the time delay of the second delaying element; and a second counter min/max tracker, in operative communication with the second comparator and the first counter, through the fifth delaying element, configured to identify the minimum counter value of times at which a power level sample from the fourth integrator exceeds the threshold value in the second comparator, and to identify the maximum counter value of times at which a power level sample from the fourth integrator exceeds the threshold value in the second comparator.

12. The Link 16 compliance monitoring system set forth in claim 9, wherein:

the central sample identifier is configured such that the counter values, from the second delaying element, that are identified as being within a prescribed difference from the mean value from the averager are those that, in consideration of the frequency of the first counter, are within a prescribed time interval from the mean value, where the prescribed time interval is no less than 1.6 microseconds.

13. The Link 16 compliance monitoring system set forth in claim 6, further comprising:

a first delaying element, in operative communication with the first digital multiplier, configured to receive a digital voltage sample from the first digital multiplier and to output said digital voltage sample after a prescribed time delay;

a second conjugator, in operative communication with the first delaying element, configured to produce a digital voltage sample that is a complex conjugate of a digital voltage sample received from the first delaying element;

a fourth digital multiplier, in operative communication with the first digital multiplier and the second conjugator, configured to digitally multiply a digital voltage sample from the first digital multiplier and a digital voltage sample from the second conjugator;

a third integrator, in operative communication with the fourth digital multiplier, configured to sum a plurality of samples therefrom;

a third power detector, in operative communication with the first digital multiplier, configured to receive a digital voltage sample therefrom to calculate a power level sample based thereon;

a first comparator, in operative communication with the third power detector, configured to compare a power level sample outputted thereby to a prescribed threshold value that is set in advance;

a first counter, configured as a free-running counter that produces counter values that increment with the passage of time;

a first counter min/max tracker, in operative communication with the first comparator and the first counter, configured to identify the minimum counter value of times at which a power level sample exceeds the prescribed threshold value in the first comparator, to identify the maximum counter value of times at which a power level sample exceeds the prescribed threshold value in the first comparator, and to output the identified minimum counter value and the identified maximum counter value;

an averager, in operative communication with the first counter min/max tracker, configured to calculate and output a mean value of the minimum counter value and the maximum counter value received therefrom;

a second delaying element, in operative communication with the first counter, configured to receive a counter value therefrom and to output said counter value after a prescribed time delay;

a central sample identifier, in operative communication with the averager and the second delaying element, configured to identify counter values, from the second delaying element, that are within a prescribed difference from the mean value from the averager;

a third delaying element, in operative communication with the third power detector, configured to receive a power level sample therefrom and to output said power level sample after a time delay that is identical to the time delay of the second delaying element;

a fourth integrator, in operative communication with the third delaying element, configured to sum a plurality of power level samples therefrom;

a fourth delaying element, in operative communication with the third power detector, configured to receive a power level sample therefrom and to output said power level sample after a total time delay that is twice the time delay of the second delaying element; and a second comparator, in operative communication with the fourth delaying element and the fourth integrator, configured to compare a power level sample from the fourth delaying element to a threshold value that is set based on a summation value from the fourth integrator, to identify a power level sample that is greater than said threshold value.

14. The Link 16 compliance monitoring system set forth in claim 13, further comprising:

a frequency bin mapper, in operative communication with the third integrator, configured to identify a frequency of the Link 16 transmission RF signal based on an output of the third integrator.

15. The Link 16 compliance monitoring system set forth in claim 13, further comprising:

a second counter for counting a frequency with which the second comparator identifies power level samples that are greater than the threshold value of the second comparator.

16. The Link 16 compliance monitoring system set forth in claim 13, further comprising:

a fifth delaying element, in operative communication with the first counter, configured to receive a counter value therefrom and to output said counter value after a prescribed total time delay that is twice the time delay of the second delaying element; and a second counter min/max tracker, in operative communication with the second comparator and the first counter, through the fifth delaying element, configured to identify the minimum counter value of times at which a power level sample from the fourth integrator exceeds the threshold value in the second comparator, and to identify the maximum counter value of times at which a power level sample from the fourth integrator exceeds the threshold value in the second comparator.

17. The Link 16 compliance monitoring system set forth in claim 13, wherein:

the central sample identifier is configured such that the counter values, from the second delaying element, that are identified as being within a prescribed difference from the mean value from the averager are those that, in consideration of the frequency of the first counter, are within a prescribed time interval from the mean value, where the prescribed time interval is no less than 1.6 microseconds.

18. A semiconductor integrated circuit for monitoring Link 16 compliance, comprising:

the Link 16 compliance monitoring system set forth in claim 1.

19. A semiconductor integrated circuit for monitoring Link 16 compliance, comprising:

the Link 16 compliance monitoring system set forth in claim 13.

* * * * *